(12) United States Patent
Wei et al.

(10) Patent No.: US 8,275,808 B2
(45) Date of Patent: *Sep. 25, 2012

(54) IDENTIFIERS FOR NON-SEARCHABLE ATTRIBUTES

(75) Inventors: Shu-Shang Sam Wei, Danville, CA (US); Roger W. Kilday, Livermore, CA (US); Victor Spivak, San Mateo, CA (US); Meir Amiel, Pleasanton, CA (US); Venkat Chandrasekaran, Newark, CA (US); Yik-Ping Li, Fremont, CA (US); Xiaofeng Ma, San Ramon, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/348,558

(22) Filed: Jan. 11, 2012

(65) Prior Publication Data

US 2012/0110024 A1 May 3, 2012

Related U.S. Application Data

(63) Continuation of application No. 12/005,142, filed on Dec. 21, 2007, now Pat. No. 8,150,887.

(51) Int. Cl.
*G06F 7/00* (2006.01)
*G06F 17/30* (2006.01)

(52) U.S. Cl. ...................................................... 707/802

(58) Field of Classification Search .................. 707/802, 707/999.2
See application file for complete search history.

(56) References Cited

U.S. PATENT DOCUMENTS

| | | | |
|---|---|---|---|
| 5,937,409 A | 8/1999 | Wetherbee | |
| 6,295,527 B1 | 9/2001 | McCormack et al. | |
| 6,754,666 B1 * | 6/2004 | Brookler et al. | 1/1 |
| 7,113,963 B1 * | 9/2006 | McCaw | 1/1 |
| 7,299,448 B2 | 11/2007 | Wong et al. | |
| 2005/0187915 A1 * | 8/2005 | De Lury et al. | 707/3 |
| 2005/0261906 A1 | 11/2005 | Glinski et al. | |
| 2006/0224568 A1 | 10/2006 | Debrito | |

* cited by examiner

*Primary Examiner* — Aleksandr Kerzhner
(74) *Attorney, Agent, or Firm* — Van Pelt, Yi & James LLP

(57) ABSTRACT

An attribute is received for storage. Whether the attribute is searchable or non-searchable in storage is determined. Storing the attribute as a searchable attribute comprises storing the attribute in a database table corresponding to a hierarchical class-based object. Storing the attribute as a non-searchable attribute comprises storing the attribute together with one or more other non-searchable attributes as a set of attributes. The set of attributes is stored in a database location outside the database table corresponding to the hierarchical class-based object, and the database location is accessed before the database table. A unique attribute identifier is associated with the attribute to distinguish between a name of the attribute and a name of one of the one or more other non-searchable attributes in the event that the name of the attribute and the name of the one of the one or more other non-searchable attributes are assigned the same name.

20 Claims, 17 Drawing Sheets

IDENTIFIERS FOR NON-SEARCHABLE ATTRIBUTES

CROSS REFERENCE TO OTHER APPLICATIONS

This application is a continuation of U.S. patent application Ser. No. 12/005,142, now U.S. Pat. No. 8,150,887, entitled IDENTIFIERS FOR NON-SEARCHABLE ATTRIBUTES filed Dec. 21, 2007, which is incorporated herein by reference for all purposes.

BACKGROUND OF THE INVENTION

In a system where hierarchical class-based objects are stored using a database, a hierarchy of database tables are associated with corresponding objects in the object hierarchy of the hierarchical class-based object. The attributes of the objects of the hierarchical class-based object are then able to be stored in a corresponding database table in the hierarchy of database tables. Storing the hierarchical class-based object in a database allows database functionality to be used. For example, attributes of the hierarchical class-based object can be searched using the databases search capability. However, accessing a desired attribute in the hierarchy of database tables can be time consuming as the system starts its database access at one table (e.g., at the base table corresponding to the top of the object and database table hierarchies) and walks the hierarchy until the table location of the desired attribute is reached. Also, each attribute is typically stored in a column of the database table where each row corresponds to an instance of the object in the system so that database memory space is taken up by allocating a location for each attribute of each object instance in a table in the database.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Storing data is disclosed. An attribute to be combined with one or more other attributes is received for storage in a database as a set of attributes. A unique attribute identifier is associated with the attribute. The identifier is usable to distinguish between two attributes in the event that the two attributes have the same name.

Figure 1:
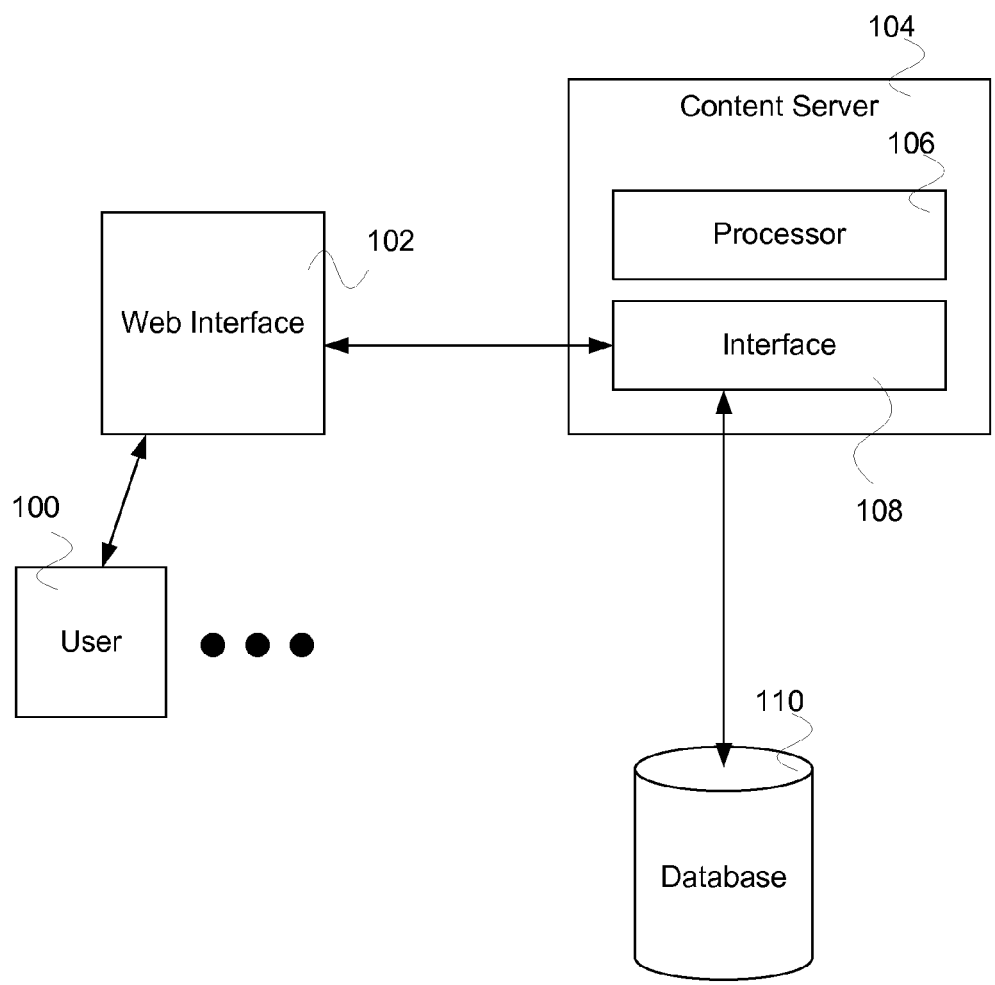
FIG. 1 is a block diagram illustrating an embodiment of a system for storing data.

FIG. 1 is a block diagram illustrating an embodiment of a system for storing data. In the example shown, one or more users, represented in FIG. 1 by user 100, communicates via web interface 102 with content server 104. Content server 104 is able to store and retrieve data using database 110. Content server 104 includes processor 106 and interface 108. Interface 108 is the interface that content server 104 uses for communication with web interface 102 and database 110. Processor 104 processes user requests and translates user requests into appropriate interactions with database 110 to respond to the user requests. In various embodiments, content server 104 provides enterprise applications including content management, retention management, business process management, life cycle management, or any other appropriate application. In some embodiments, content server 104 enables the storage of hierarchical class-based objects in a hierarchy of database tables stored in database 110.

Figure 2A:
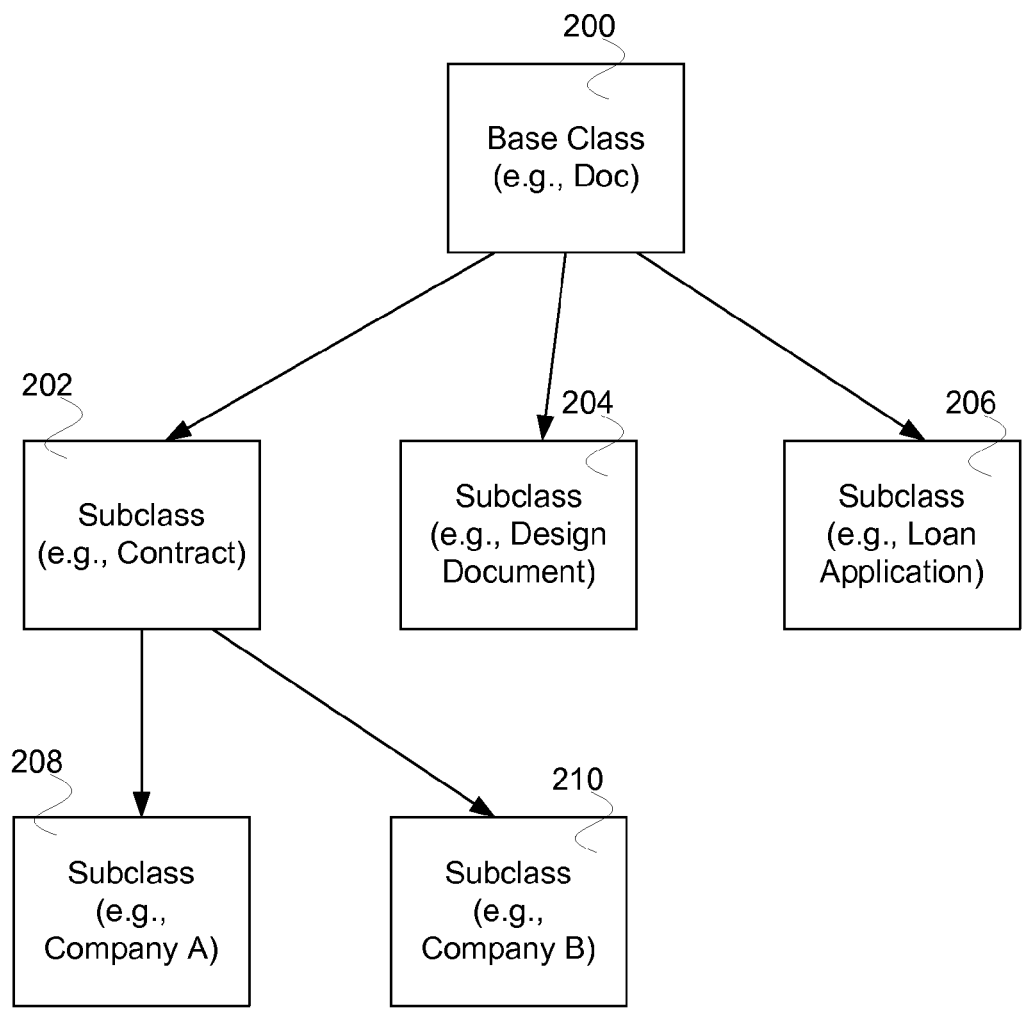
FIG. 2A is a block diagram illustrating an embodiment of a hierarchical class-based object.

FIG. 2A is a block diagram illustrating an embodiment of a hierarchical class-based object. In the example shown, hierarchical class-based object includes base class 200, subclass 202, subclass 204, subclass 206, subclass 208, and subclass 210. In a hierarchical class-based object a subclass object inherits attributes and methods from a parent object. In one example, a hierarchical class-based object includes a base class 'document' with subclasses of 'contracts,' 'design documents,' and 'loan applications,' which inherit attributes and methods from 'document.' And, further in the example, subclass 'contracts' has associated subclasses of 'company A contracts' and 'company B contracts.' In various embodiments, a hierarchical class-based object has more or fewer objects at more or fewer levels from the base class, as appropriate.

Figure 2B:
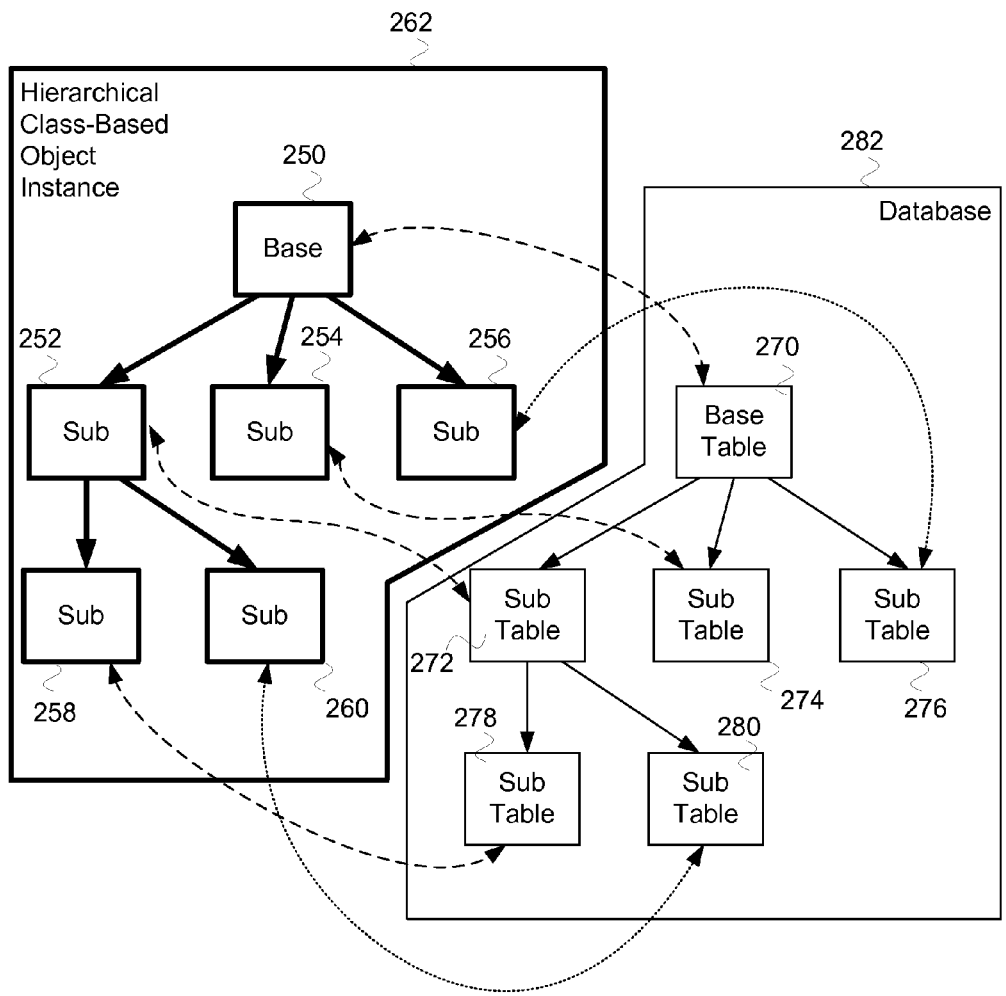
FIG. 2B is a block diagram illustrating an embodiment of a database hierarchy of tables corresponding to a class hierarchy of objects.

FIG. 2B is a block diagram illustrating an embodiment of a database hierarchy of tables corresponding to a class hierarchy of objects. In the example shown, hierarchical class-based object instance 262 includes objects: base 250, sub 252, sub 254, sub 256, sub 258, and sub 260. Database 282 includes database tables: base table 270, sub table 272, sub table 274, sub table 276, sub table 278, and sub table 280. Base table 270 corresponds to base object 250, where base table 270 is able to store attributes of base object 250. Similarly, sub tables 272, sub table 274, sub table 276, sub table 278, and sub table 280 correspond to sub object 252, sub object 254, sub object 256, sub object 258, and sub object 280, respectively. A sub table is able to store attributes of its corresponding sub object. In some embodiments, access to a table in the hierarchy of tables begins at a table (e.g., the top table: base table 250) and proceeds to other tables that are connected. The more tables that need to be accessed before reaching the appropriate table for a given attribute, the more time that is necessary for accessing the given attribute. In some embodiments, more than one table (e.g., two tables such as a primary table and a repeating value table) corresponds to an object of the hierarchical class-based object.

Figure 3:
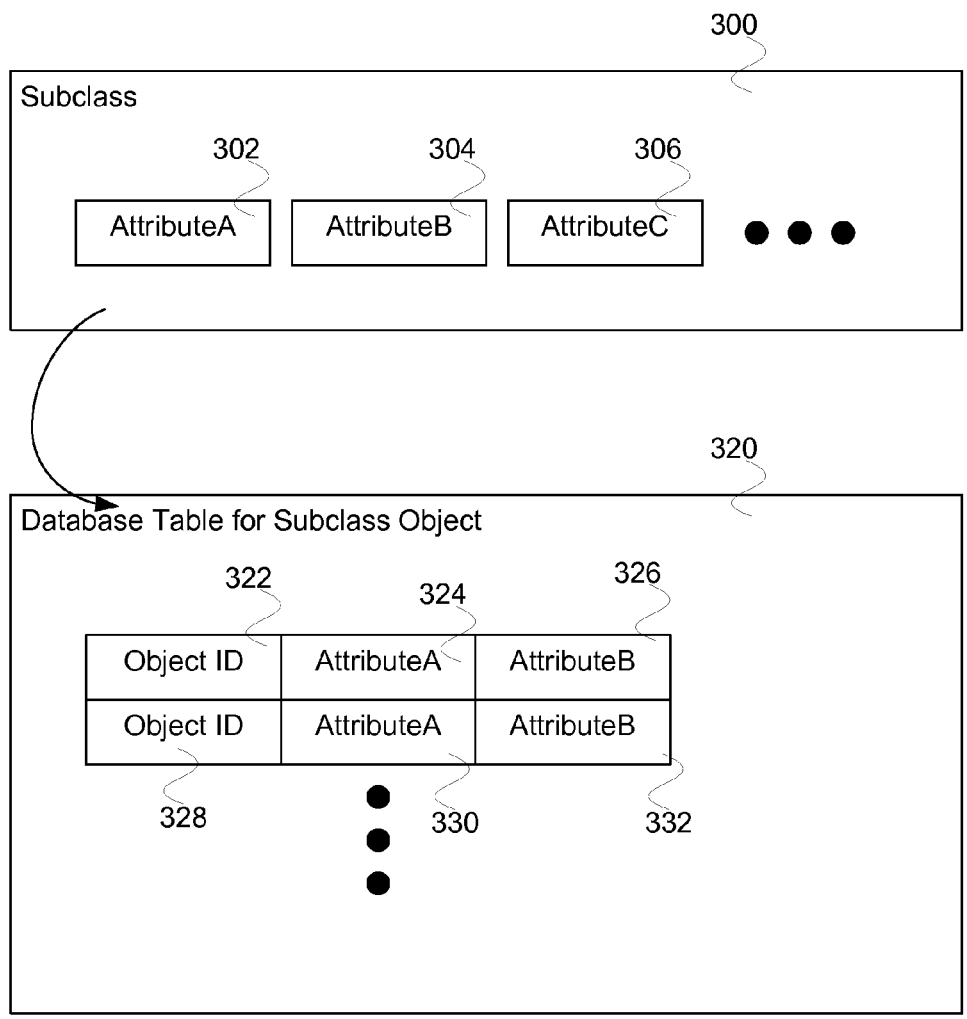
FIG. 3 is a block diagram illustrating an embodiment of a subclass and its corresponding database table.

FIG. 3 is a block diagram illustrating an embodiment of a subclass and its corresponding database table. In the example shown, subclass 300 includes a plurality of attributes represented in FIG. 3 by attribtueA 302, attributeB 304, and attributeC 306. Database table for subclass object 320 includes storage of attributeA 324 and attributeB 326 for object ID 322 and storage for attributeA 330 and attribute 332 for object ID 328. Object ID 320 and object ID 328 correspond to two instances of subclass object 300.

Efficient storage of an attribute is disclosed. An attribute is received. The attribute is included in a combined set of attributes stored in a database. The database accesses the combined set of attributes as a whole set. The attribute as stored in the combined set is not required to be directly searchable by the database.

In some embodiments, the set of attributes is stored in a "property bag" of attributes that are stored together, e.g., in one or more storage locations (e.g., one or more database cells) where each database cell stores more than one attribute of the set of attributes. The combined set of attributes is stored in one or more database locations not specific to any one attribute in the combined set. By storing the set of attributes in one location (or only a few locations) in a database table, the number of columns required in a database table is reduced improving storage efficiency. In some embodiments, the set of attributes is stored in a database table that is accessed first by the system, for example, one at a highest level of a hierarchy of database tables. By storing the set of attributes in the table that is accessed first by the system, access time to retrieve attributes is reduced. In some embodiments, the database table is not the first table, but is a database table that is accessed before the database table that otherwise would have been used to store a given attribute if it were stored in its regular location in a hierarchy of tables storing attributes for a hierarchical class-based object.

Figure 4:
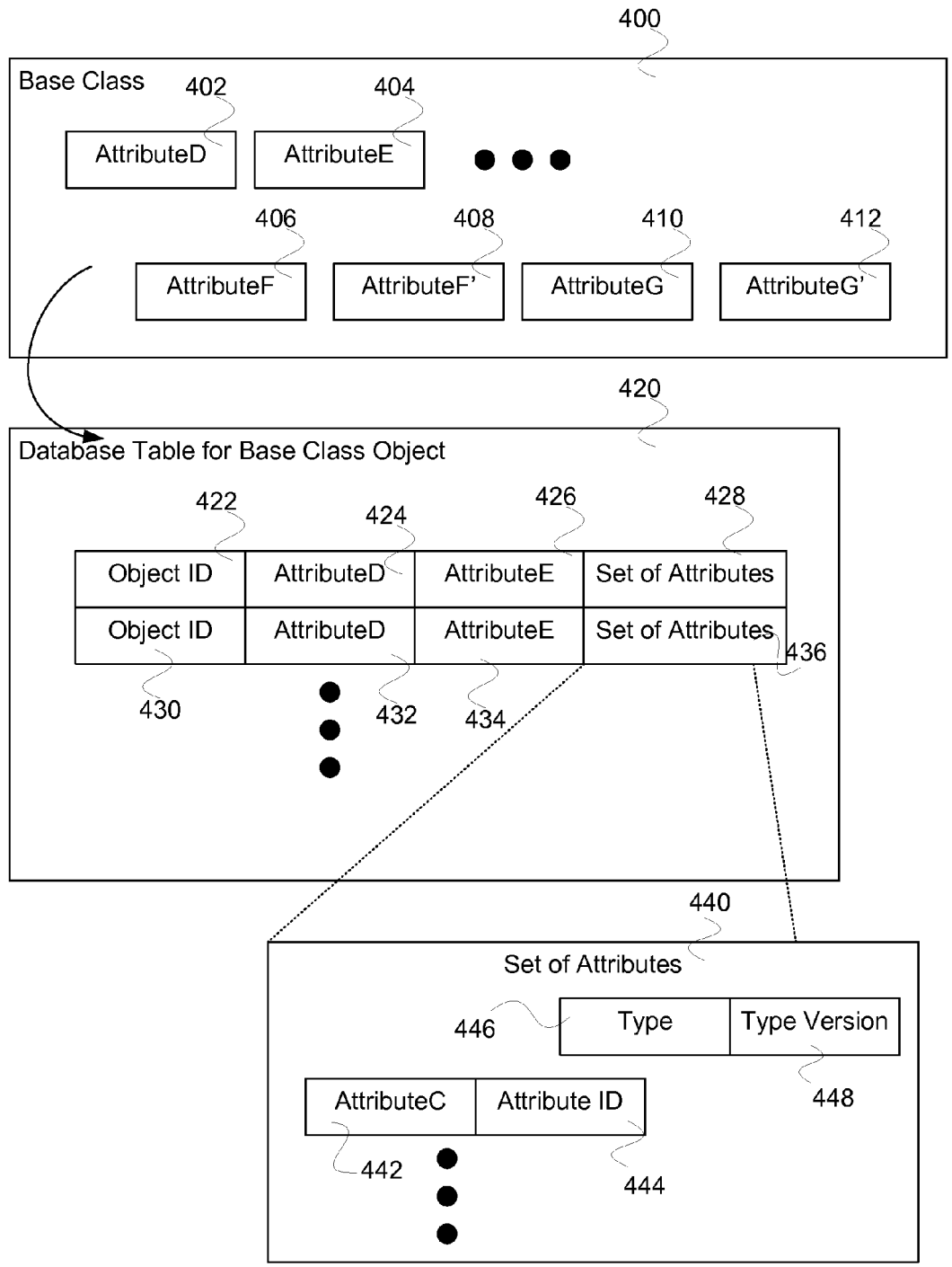
FIG. 4 is a block diagram illustrating an embodiment of a base class object and its corresponding database table.

FIG. 4 is a block diagram illustrating an embodiment of a base class object and its corresponding database table. In the example shown, base class 400 includes a plurality of attributes, represented in FIG. 4 by attributeD 402, attributeE 404, attribute F 406, attributeF' 408, attributeG 410, and attributeG' 412. Database table for base class object 420 includes attributeD 424, attributeE 426, and set of attributes 428 for object identifier (ID) 422. Database table for base class object 420 further includes attributeD 432, attributeE 434, and set of attributes 436 for object ID 430. Object ID 422 and object ID 430 correspond to two instances of base class 400. Set of attribute 440 includes type 446 and type version 448. Set of attributes 440 also includes a plurality of attributes including attributeC 442 and corresponding attribute ID 444. In various embodiments, set of attributes 440 is used to implement set of attributes 428 and/or set of attributes 436. In some embodiments, attributeC (e.g., attributeC 306 of subclass 300 in FIG. 3) is designated as non-searchable and stored in set of attributes 440. Storing attributeC in set of attributes 440 enables attributeC to be accessed more rapidly because database table for base class object 420 is accessed before the table for the subclass associated with attributeC (e.g., database table for subclass object 320 of FIG. 3 which is lower in the hierarchy of database tables than database table for base class object 420). A plurality of attributes stored in set of attributes 440 also reduces the number of columns required to store attributes of hierarchical class-based object likely reducing the space required for storing the hierarchical class-based object in the database.

A type (e.g., type 446) includes attribute IDs, attribute names, and formats as well as a type version (e.g., type version 448) for attributes associated with a set of attributes (e.g., set of attributes 440). A type version (e.g., type version 448) identifies the version of a type (e.g., type 446) associated with a set of attributes (e.g., set of attributes 440). A type version enables proper identification of attributes in the set of attributes by indicating a change to the type when an attribute is added to, deleted from, or changed in the set of attributes.

Set of attributes 440 stores one or more attributes as a set of attributes in a single location (e.g., a database cell) in database table for a base-class object. An attribute (e.g., attributeC 442) of the set of attributes (e.g., set of attributes 440) is converted to one or more bytes using the information of a type (e.g., type 446). The one or more bytes are concatenated into a set of bytes. In various embodiments, converting includes converting an attribute value from an integer value, a real value, a string value, or a byte value to a series of bytes; compressing multiple attribute values into a series of bytes; adding formatting such as a separator, an index, or an identifier as one or more bytes between bytes storing attribute values; adding an attribute ID, adding a check sum, an error detection code, an error correction code to the series of bytes storing the attributes in the set of attributes; or any other appropriate manner of converting a set of attributes to a set of bytes.

In some embodiments, a set of bytes stored is converted to a set of attributes using type and type version information. In various embodiments, converting includes converting byte values to attribute values (e.g., to an integer value, a real value, a string value, a byte value), uncompressing multiple attribute values, removing format formatting (e.g., a separator, an index, or an identifier, etc.) between attribute values, removing attribute IDs; checking a check sum, an error detection code, an error correction code; correcting the attribute values in the set of attributes using the correction code, or any other appropriate manner of converting a set of bytes to a set of attributes.

Figure 5:
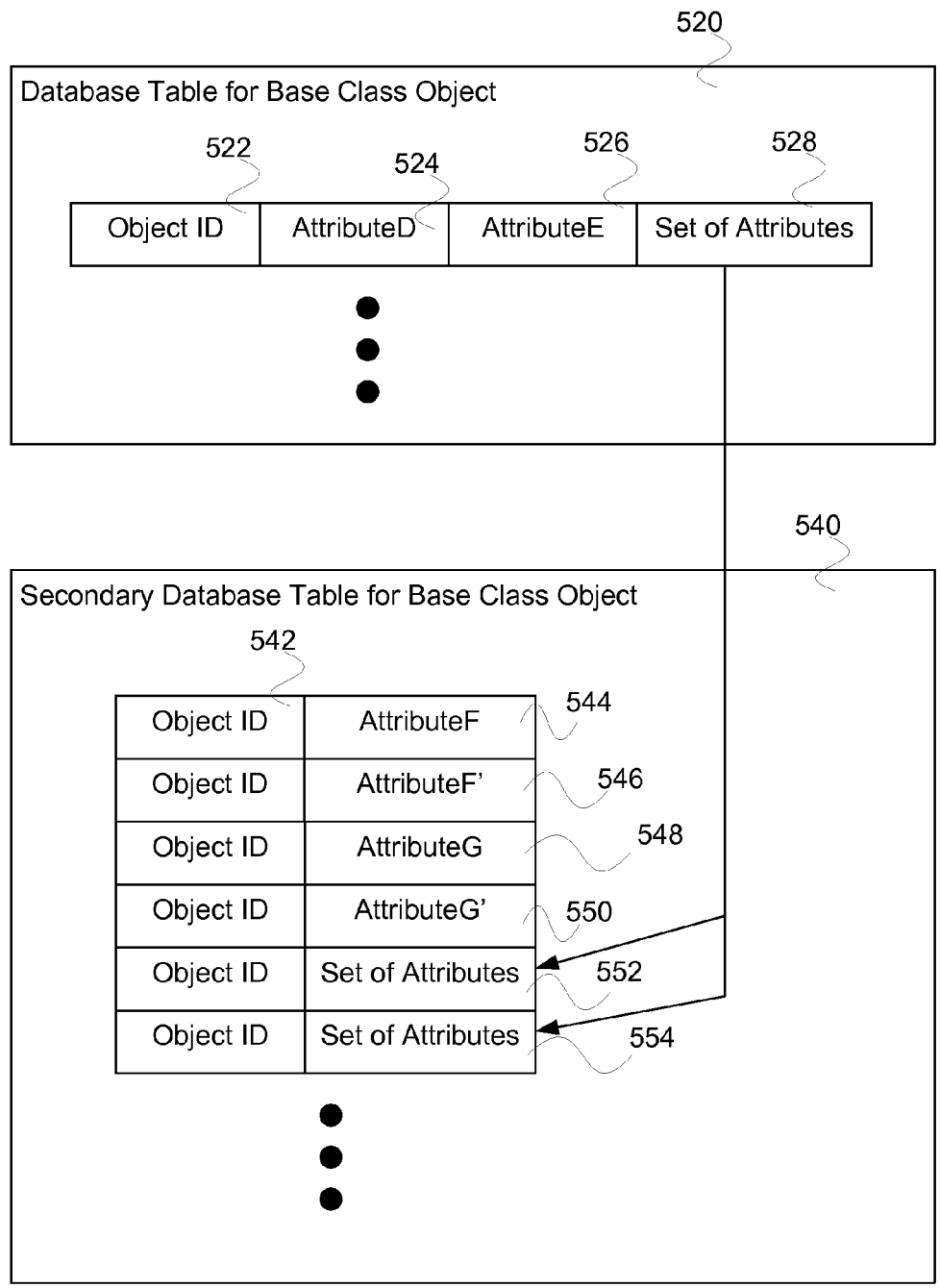
FIG. 5 is a block diagram illustrating an embodiment of a database table for a base class object and a secondary database table for base class object.

FIG. 5 is a block diagram illustrating an embodiment of a database table for a base class object and a secondary database table for base class object. In the example shown, database table for base class object 520 includes a plurality of entries represented in FIG. 5 by object ID 522, attributeD 524, attributeE 526, and set of attributes 528. Secondary database table for base class object 540 includes a plurality of entries represented by object ID 542 for attributeF 544, attributeF' 546, attributeG 548, attributeG' 550, set of attributes 552, and set of attribute 554 (and corresponding object IDs for each attribute—not all numbered in FIG. 5). Object IDs identify an associated instance of an object with which the attribute or set of attributes is associated. Secondary database table for base class object 540 is used for storing repeating attributes (e.g., attributeF 544 and attributeF' 546 or attributeG 548 and attributeG' 550). Secondary database table for base class object 540 is also used to store a portion of a set of attributes. For example, a set of attribute, when converted to a set of bytes, no longer fits in database location associated with database table for base class object 520. The set of attributes, as a set of bytes, is stored in more than one database table locations (e.g., in secondary database table for base class object 540). The set of bytes can be striped across the table locations (e.g., roughly equal number of bytes in each table location or fill one location and then another and then another as appropriate). In various embodiments, set of attributes 528, set of attributes 552, and set of attributes 554 are each able to store a few thousand bytes (e.g., 2000 bytes in the data cell) where set of attributes 528 is filled before using set of attributes 552 and where set of attributes 552 is filled before using set of attributes 554. More data cells can be used to store a set of attributes in secondary database table for base class object 540 as required.

Figure 6:
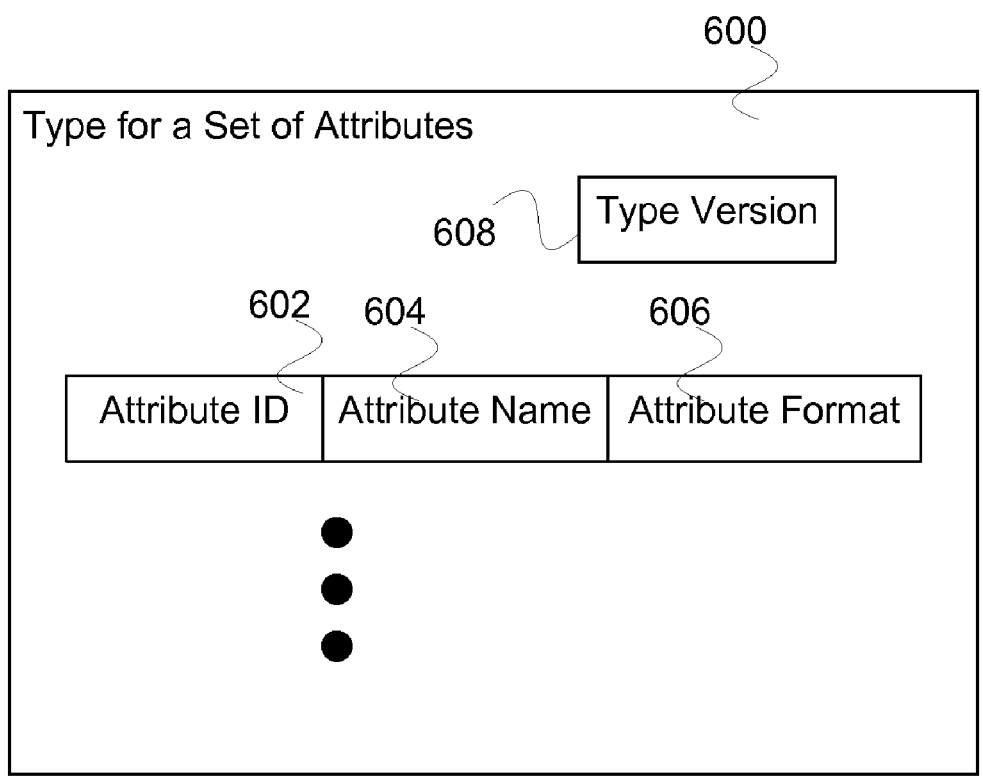
FIG. 6 is a block diagram illustrating an embodiment of a type for a set of attributes.

FIG. 6 is a block diagram illustrating an embodiment of a type for a set of attributes. In the example shown, type for a set of attributes 600 includes type version 608 as well as a plurality of attribute entries represented in FIG. 6 by attribute ID 602, attribute name 604 and attribute format 606. Attribute ID 602 is a unique ID. Attribute ID 602 is associated with attribute name 604 and is stored in an attribute set in attribute format 606 (e.g., integer*16, real*32, byte[64], string[5], etc.). Type information in type for a set of attributes 600 enables the converting of a set of attributes associated with the type to a set of bytes and vice versa.

Figure 7:
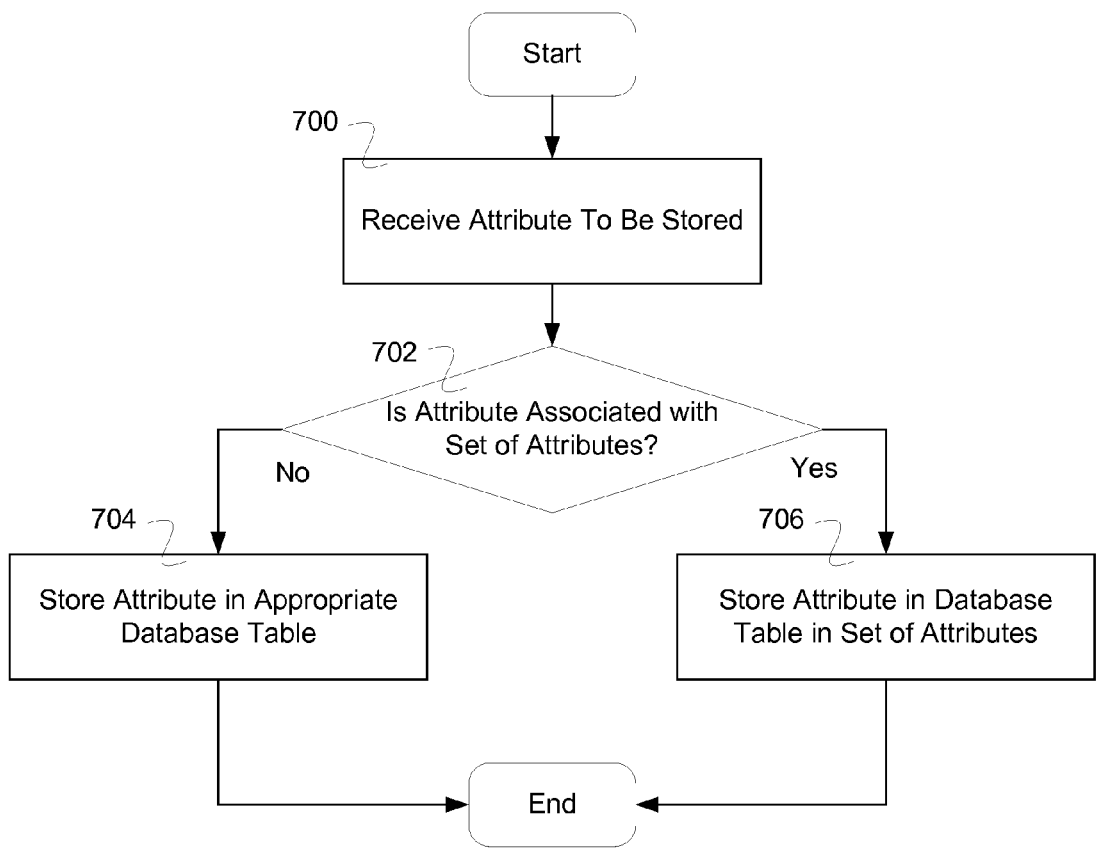
FIG. 7 is a flow diagram illustrating an embodiment of a process for storing an attribute.

FIG. 7 is a flow diagram illustrating an embodiment of a process for storing an attribute. In the example shown, in 700 an attribute is received to be stored. In 702, it is determined whether an attribute is associated with a set of attributes. In some embodiments, an attribute is associated with a set of attributes when the attribute is designated as non-searchable. If the attribute is associated with the set of attributes, then in 706 the attribute is stored in a database table in a set of attributes and the process ends. If the attribute is not associated with a set of attributes, then in 704 the attribute is stored in the appropriate database table (e.g., in a database table in a hierarchy of tables corresponding to the object associated with the attribute to be stored where the object is part of a hierarchical class-based object) and the process ends.

Storing an attribute is disclosed. An attribute is received to be combined with one or more other attributes for storage in a database as a set of attributes. The attribute is associated with a unique identifier usable to distinguish between two attributes in the event the same attribute name is used for both. In various embodiments, a type is associated with a set of attributes and/or a type version is associated with a set of attributes. The type indicates, for a set of attributes, the attribute identifiers, the associated names, and the attribute formats. The type version indicates, for a set of attributes, the type associated with the set of attributes. The type version is changed for a deletion, an addition, or a change to the attributes, attribute identifiers, attribute names, and/or attribute formats associated with a set of attributes.

Figure 8A:
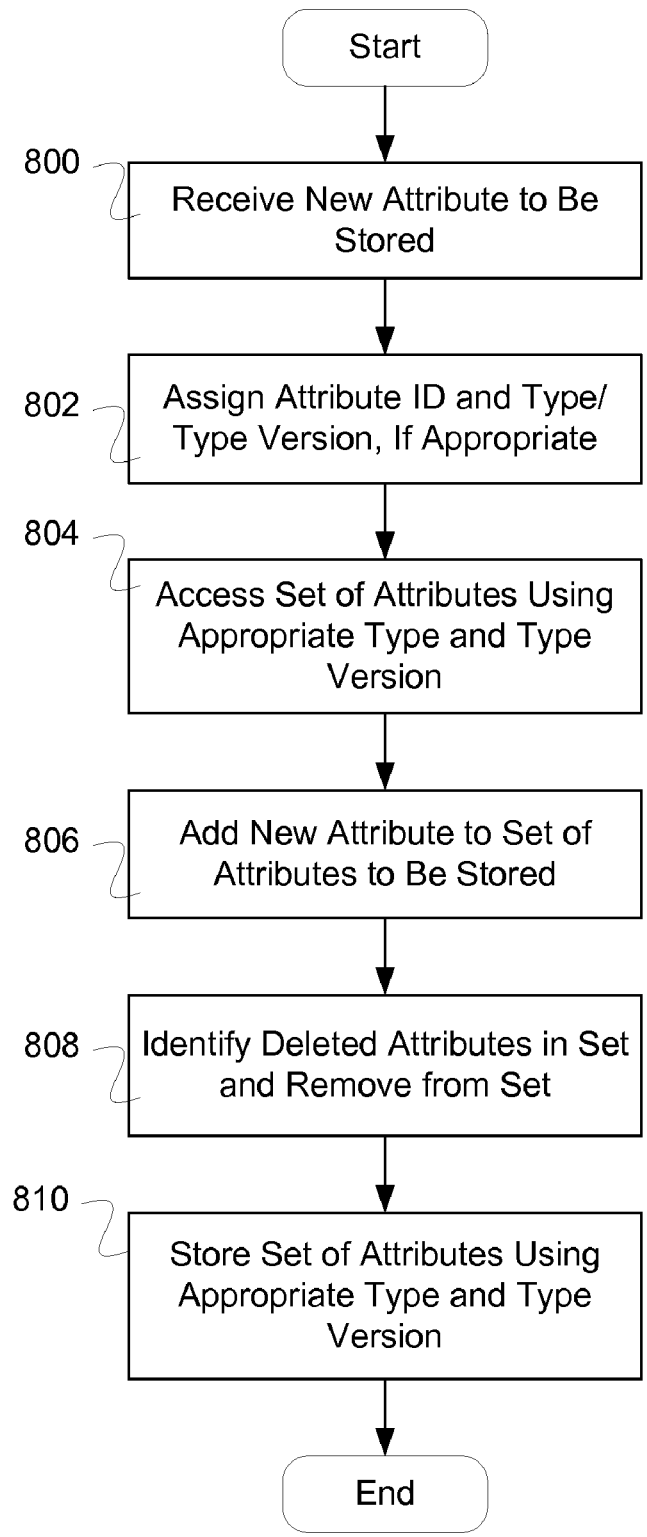
FIG. 8A is a flow diagram illustrating an embodiment of a process for storing an attribute.

FIG. 8A is a flow diagram illustrating an embodiment of a process for storing an attribute. In some embodiments, the process of FIG. 8 is used to implement 706 of FIG. 7. In the example shown, in 800 a new attribute is received to be stored. In 802, an attribute ID is assigned and, if appropriate, a type and type version are assigned. The unique attribute ID enables the system to distinguish between attributes with the same name. In various embodiments, the unique ID is assigned within a type, globally in terms of the same type hierarchy, globally, or in any other appropriate manner. A type and type version may be assigned in the event that a creation of an entire set, an addition, a deletion, or changes are made to the set of attributes. In 804, a set of attributes is accessed using the appropriate type and version. In 806, a new attribute is added to the set of attributes to be stored. In 808, deleted attribute(s) is/are identified in the set of attributes and removed from the set. In 810, the set of attributes is stored using the appropriate type and type version.

Storing data value is disclosed. In various embodiments, the data value comprises an attribute value, an attribute name, an attribute identifier, a type, a type version, or any other appropriate data value. A data value is received that is not required to be stored in a database in a manner that enables a database query to be performed against the value. The value is combined with one or more other values to generate a set of values. A set of bytes is determined based at least in part on the set of values. The set of bytes is stored in one or more database cells. Each of the one or more database cells stores more than one value of the set of values. In some embodiments, a type and type version enables appropriate conversion between the set of bytes and the set of values including considerations that occur as values are added to, deleted from, or changed in the set of values.

Figure 8B:
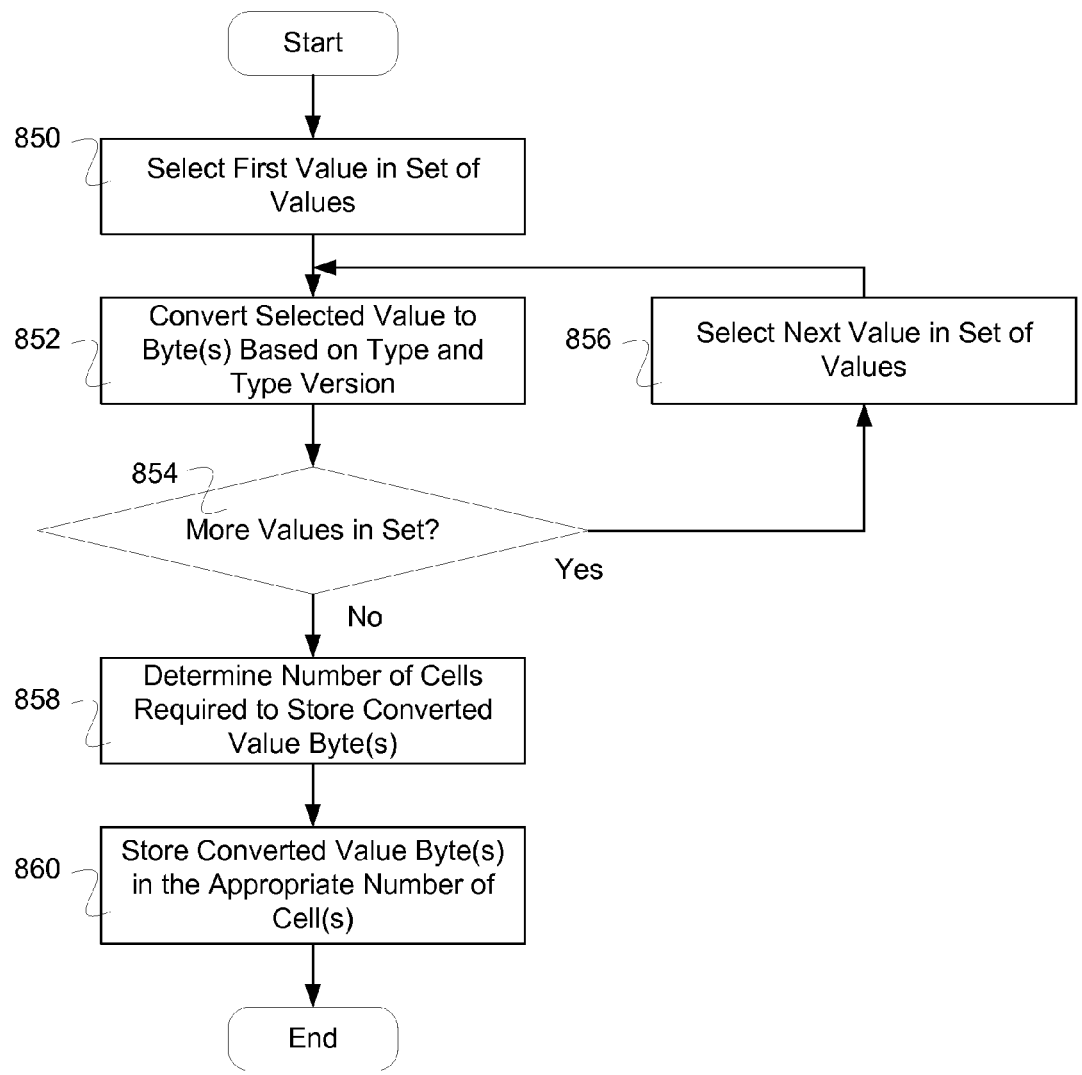
FIG. 8B is a flow diagram illustrating an embodiment of a process for storing a set of values.

FIG. 8B is a flow diagram illustrating an embodiment of a process for storing a set of values. In some embodiments, the process of FIG. 8B is used to implement 810 of FIG. 8A. In the example shown, in 850 a first value is selected in the set of attributes. In 852, the selected value is converted to byte(s) based on type and type version. In various embodiments, conversion includes taking attribute values and formatting the attribute values into a series of bytes that include the attribute values, the attribute IDs, a type version, as well as formatting information such as separators, indexes, compression information, error detection or correction information, or any other appropriate information for converting the set of attribute values to a set of bytes. In 854, it is determined if there are more values in the set. If there are more values in the set, then in 856, a next value in the set of values is selected, and control passes to 852. If there are no more values in the set, then in 858 a number of database cells required to store converted value bytes is determined. In 860, the converted value byte(s) are stored in the appropriate number of cells. In some embodiments, the converted value byte(s) are stored at the same time as the other regular attributes, whenever possible, to avoid an extra database INSERT/UPDATE statement.

Retrieval of attributes is disclosed. A request is received to retrieve an object. For example, a search is performed where an object is identified and to provide the object as part of the response to the search a request is made to retrieve the object. A retrieval response is generated that includes searchable attributes of the object and non-searchable attributes of the object. In some embodiments, the non-searchable attributes of the object are stored as a set of attributes. The database accesses the set of attributes as a whole set of attributes.

Figure 9:
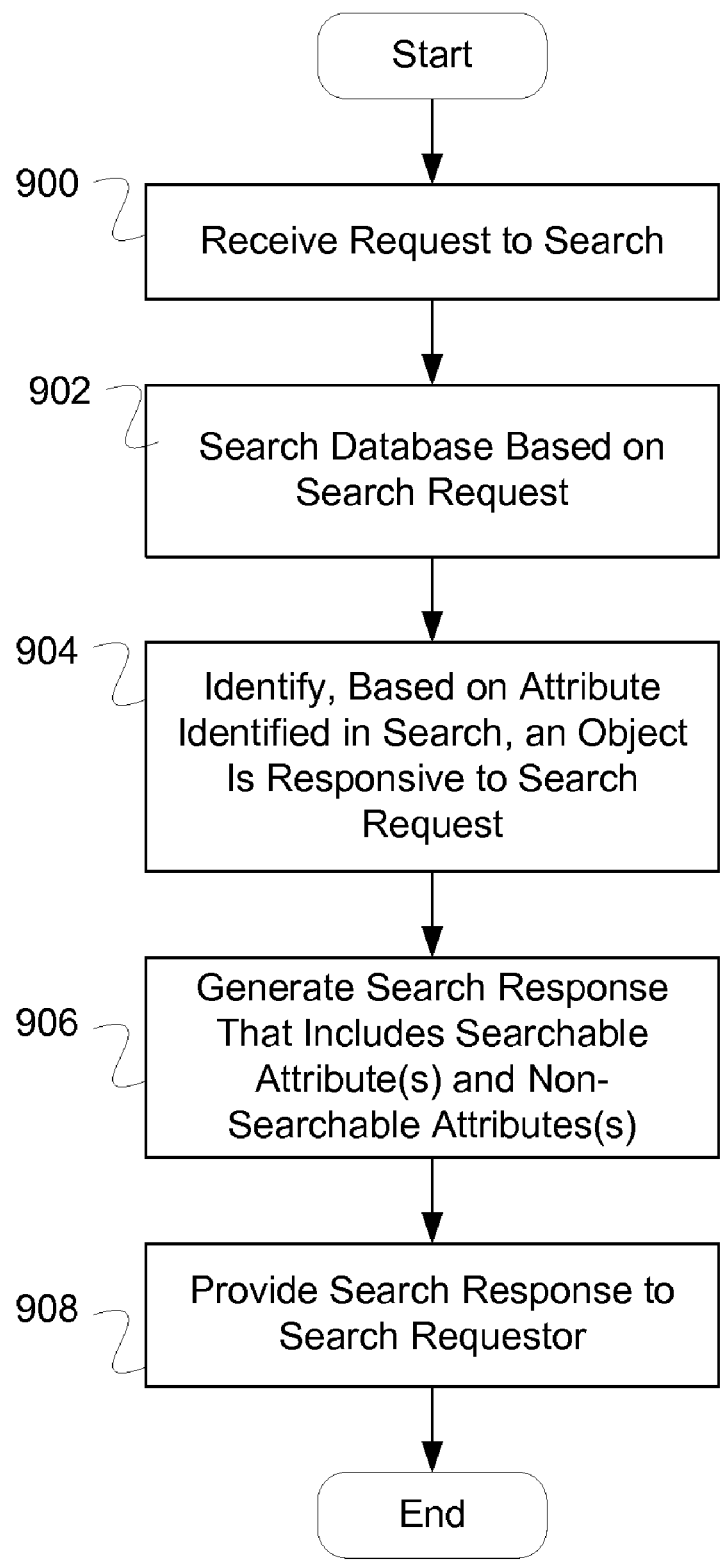
FIG. 9 is a flow diagram illustrating an embodiment of a process for retrieving an attribute.

FIG. 9 is a flow diagram illustrating an embodiment of a process for retrieving an attribute. In the example shown, in 900 a request is received to search. In 902, a database is searched based on the search request. In 904, based on an attribute identified in the search, an object is identified that is responsive to the search request. In 906, a search response is generated that includes searchable attribute(s) and non-searchable attribute(s). In some embodiments, searchable attributes are stored in database tables corresponding to a hierarchical class-based object and non-searchable attribute(s) are stored in one or more cells in one or more tables at the top of a database hierarchy and can only be accessed as a set of attributes. In 908, a search response is provided to the search requestor.

Storing an attribute is disclosed. An attribute is received for a hierarchical class-based object. The attribute is stored in a database both at a first location in a first table at a first level of a hierarchy of database tables and a second location in a second table at a second level of the hierarchy. The second level is higher than the first level. The table hierarchy is based on a class hierarchy associated with the hierarchical class-based object. In various embodiments, the second level is accessed faster than the first level and/or the second level is associated with the base class level of the hierarchy of the object. In some embodiments, the second location stores one or more attributes as a set of attributes that can only be accessed as a whole set. In some embodiments, the first table is associated with a customization object where the customization object is not part of the class-based hierarchy of objects. Instead the customization object enables customizing instances of a class-based hierarchy of objects without defining a new class of objects. In some embodiments, a customization object is referred to as an aspect. In various embodiments, one, some, or all attributes of a customization object are stored both in a table associated with the customization object and in a higher table (e.g., base table) to enable a faster or optimized fetching of the one, some, or all attributes associated with the customized object. In some embodiments, the storage in the higher table comprises storing the one, some, or all attributes in a set of attributes which set is stored in a database such that the database can only access the set of attribute as an entire set.

Figure 10A:
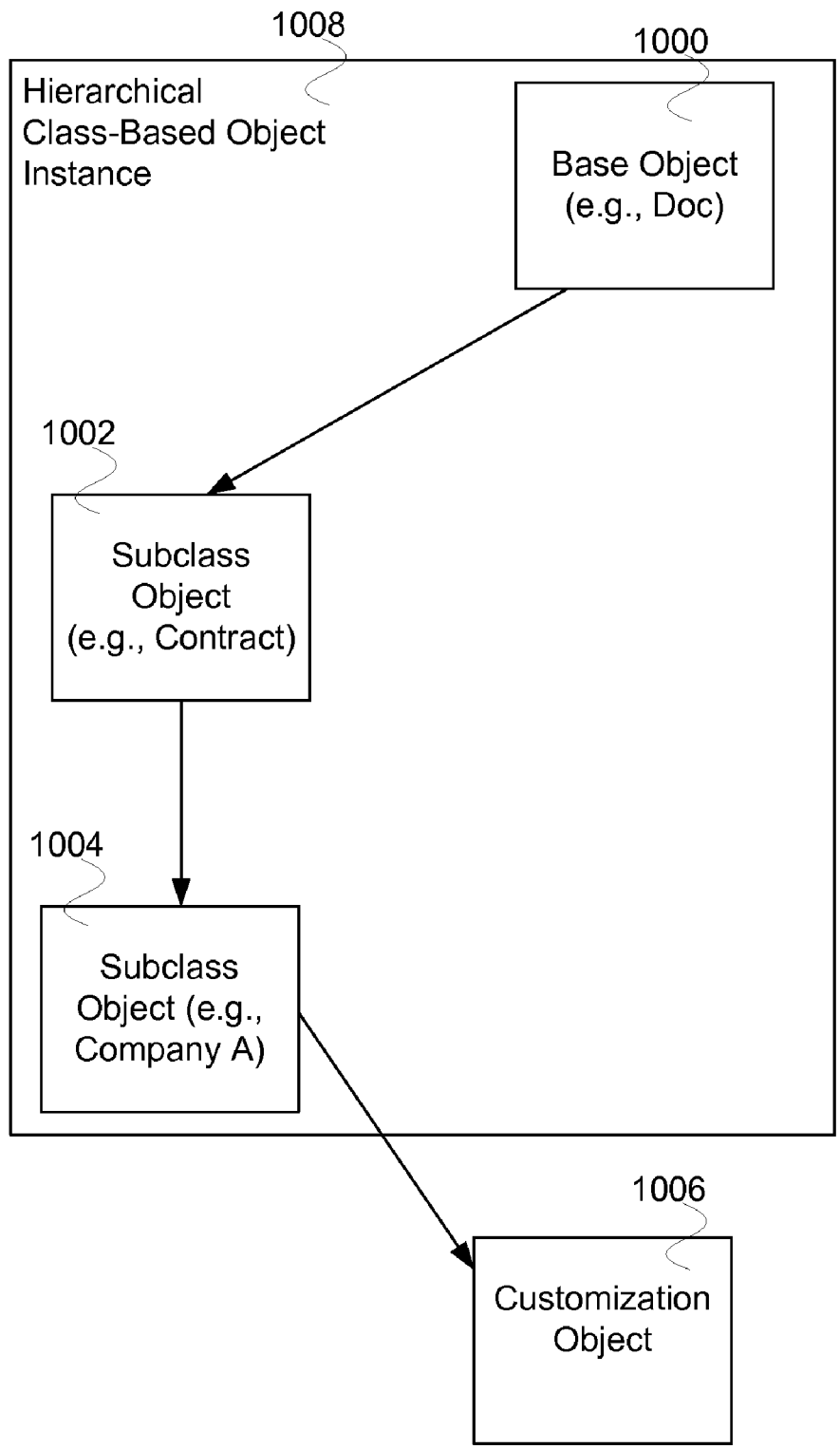
FIG. 10A is a block diagram illustrating an embodiment of a hierarchical class-based object instance and a customization object.

FIG. 10A is a block diagram illustrating an embodiment of a hierarchical class-based object instance and a customization object. In the example shown, hierarchical class-based object instance 1008 includes base object 1000 (e.g., a document), subclass object 1002 (e.g., a contract), subclass object 1004 (e.g., company A), and customization object 1006. Customization object 1006 is used to customize a hierarchical class-based object instance 1008. In some embodiments, customization object 1006 is referred to as an aspect.

Figure 10B:
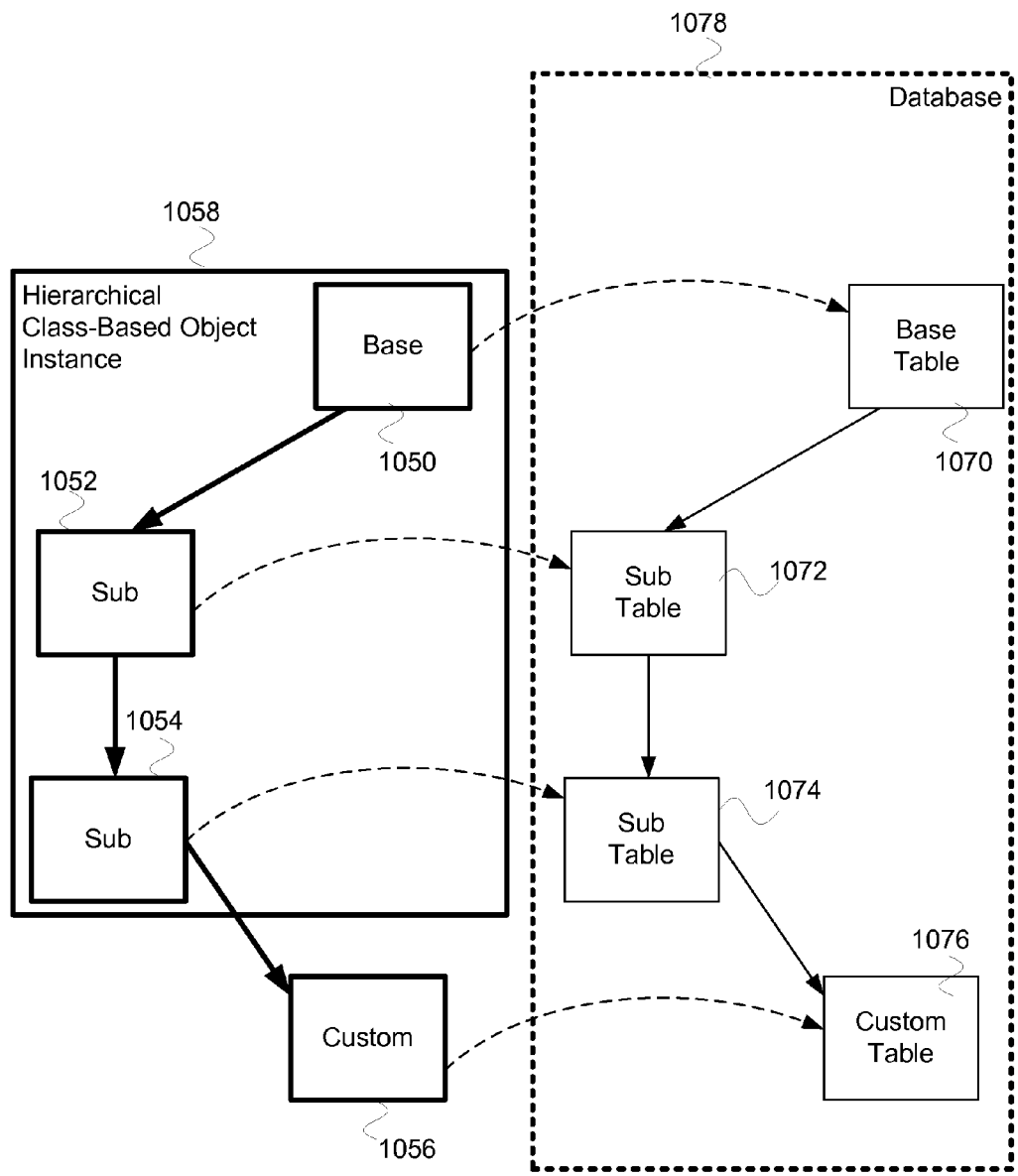
FIG. 10B is a block diagram illustrating an embodiment of database tables corresponding to a hierarchical class-based object instance and a customization object.

FIG. 10B is a block diagram illustrating an embodiment of database tables corresponding to a hierarchical class-based object instance and a customization object. In the example shown, hierarchical class-based object instance 1058 includes base 1050, sub 1052, and sub 1054. Custom 1056 customizes hierarchical class-based object instance 1058 and enables adding attributes and/or methods associated with custom 1056 without the need to create a separate class that includes custom as part of a hierarchical class-based object. Custom 1056 is associated with sub 1054 of hierarchical class-based object instance 1058. Database 1078 includes base table 1070, sub table 1072, sub table 1074, and custom table 1076 that correspond to base 1050, sub 1052, sub 1054, and custom 1056, respectively. In some embodiments, more than one table in database 1078 is used to store attributes of the corresponding object. For example, a database can use a primary table for storing single attribute values and a secondary table for storing repeating attribute values. A row in base table 1070 stores attribute values associated with an instance of an object, such as hierarchical class-based object 1058, where the columns store a given attribute of the object.

Figure 11:
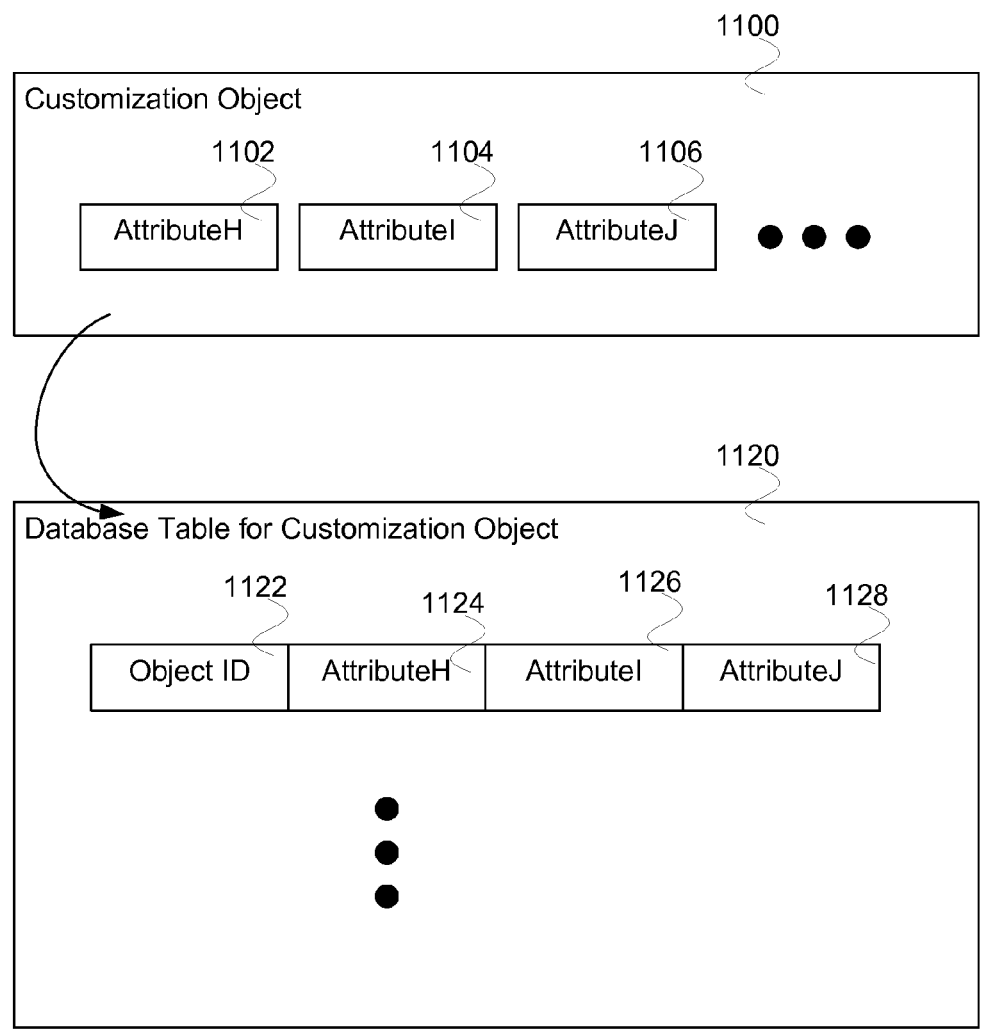
FIG. 11 is a block diagram illustrating an embodiment of a customization object and a corresponding database table for the customization object.

FIG. 11 is a block diagram illustrating an embodiment of a customization object and a corresponding database table for the customization object. In the example shown, customization object 1100 includes a plurality of attributes represented in FIG. 11 by attributeH 1102, attributeI 1104, and attributeJ 1106. Database table for customization object 1120 includes a plurality of entries. Each entry includes object ID 1122, attributeH 1124, attributeI 1126, and attributeJ 1128.

Figure 12:
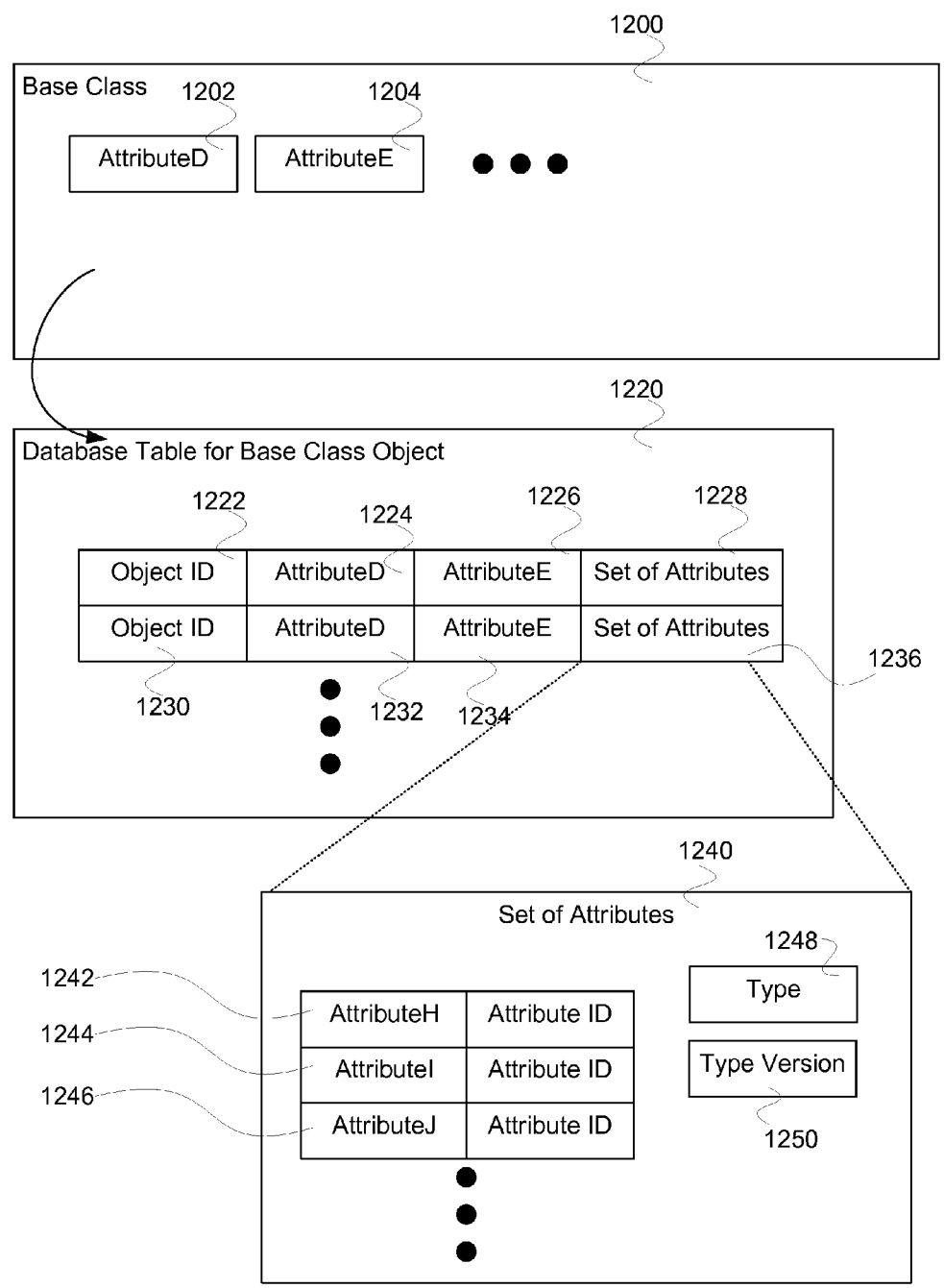
FIG. 12 is a block diagram illustrating an embodiment of a base class and database table for the base class object.

FIG. 12 is a block diagram illustrating an embodiment of a base class and database table for the base class object. In the example shown, base class 1200 includes a plurality of attributes represented in FIG. 12 by attributeD 1202 and attributeE 1204. Database table for base class object 1220 includes a plurality of entries represented in FIG. 12 by object ID 1222, attributeD 1224, attributeE 1226, and set of attributes 1228, and object ID 1230, attributeD 1232, attributeE 1234, and set of attributes 1236. Object ID 1222 and object ID 1230 indicate object instance identifiers for an instance of the hierarchical class-based object of which base class 1200 is a part of. Set of attributes 1240 includes type 1248 and type version 1250 as well as attributeH 1242, attributeI 1244, and attributeJ 1246 (and corresponding attribute ID's which are not numbered in FIG. 12).

In some embodiments, one or more attributes associated with a customization object is/are optimized for fetching by storing a copy of the one or more attributes in a set of attributes that is accessible more rapidly than the attributes stored in the customization object. The set of attributes is stored in a cell of a table corresponding to the base class object (e.g., database table for base class object 1220). In some embodiments, more than one database cell is used to store the set of attributes. In some embodiments, the set of attributes is converted to a set of bytes before storing in the one or more database cells.

Figure 13:
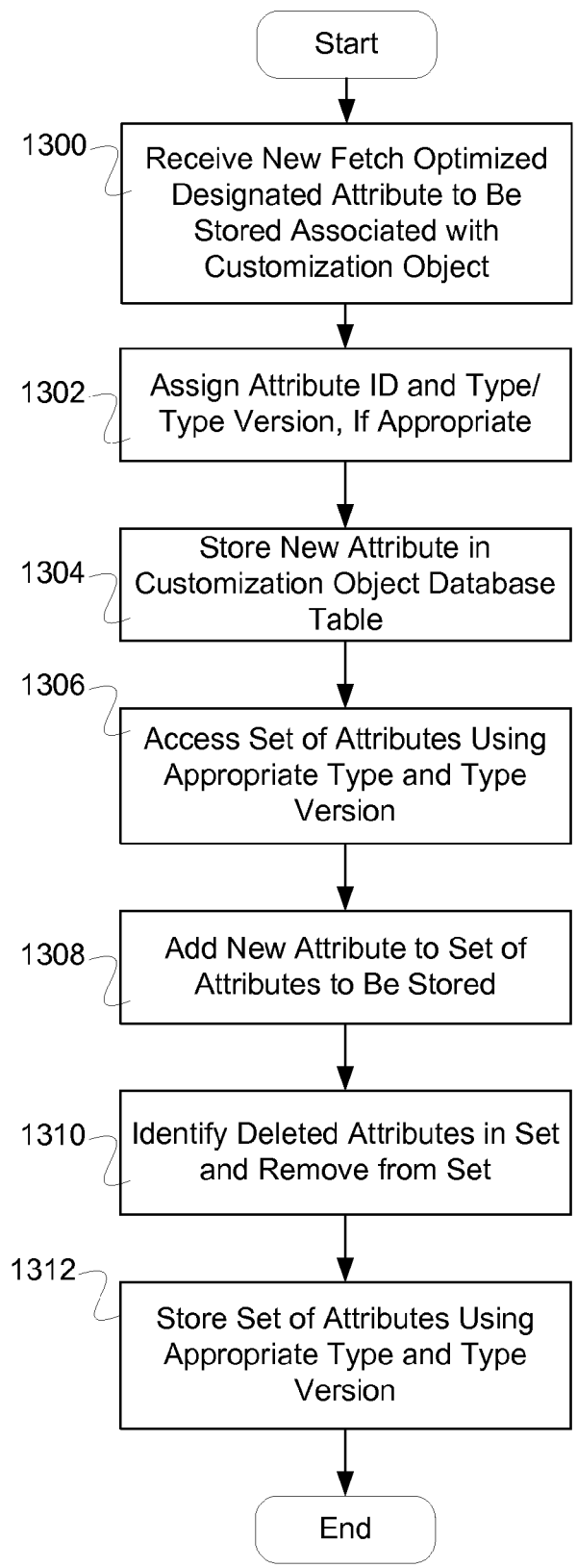
FIG. 13 is a flow diagram illustrating an embodiment of a process for storing an attribute.

FIG. 13 is a flow diagram illustrating an embodiment of a process for storing an attribute. In the example shown, in 1300 a new fetch optimized designated attribute is received to be stored associated with a customization object. In 1302, an attribute ID is assigned, and type/type version is assigned if appropriate. The attribute ID is a unique ID for the attribute and enables the attribute to be distinguished in the event that another attribute associated with the object as the same name. The attribute is to be stored as part of a set of objects according to a type definition for the set of attributes where the type definition has a type version associated with it. The type definition and type version enable the conversion of the set of attributes to and from a set of bytes, where the set of bytes are stored in the location in a database (e.g., a cell in a database table). In 1304, a new attribute is stored in the customization object database table. In 1306, a set of attributes is accessed using the appropriate type and type version. In 1308, the new attribute is added to set of attributes to be stored. In 1310, deleted attributes in the set are identified and removed from set. In 1312, the set of attributes is stored using the appropriate type and type version.

Figure 14:
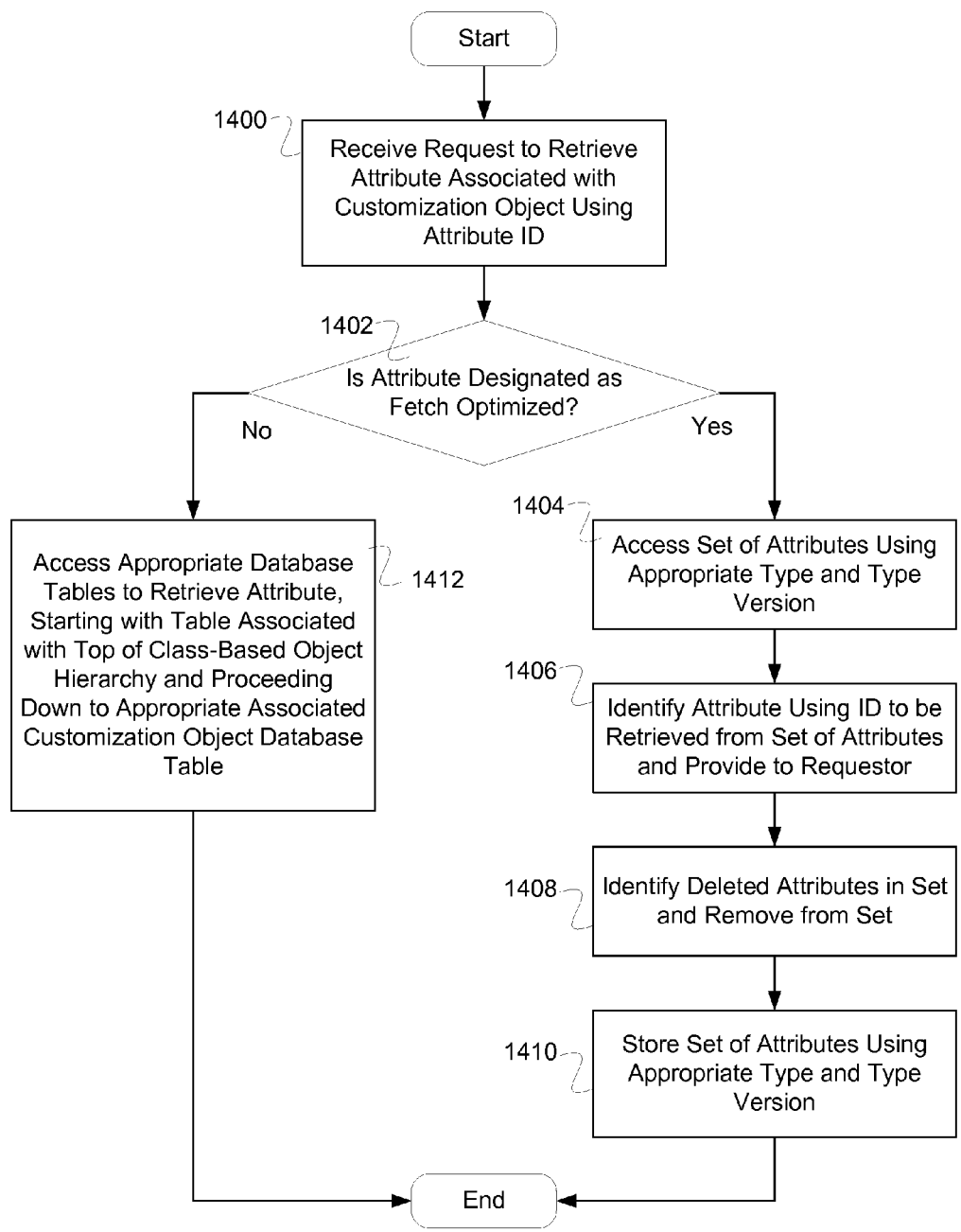
FIG. 14 is a flow diagram illustrating an embodiment of a process for retrieving an attribute.

FIG. 14 is a flow diagram illustrating an embodiment of a process for retrieving an attribute. In the example shown, in 1400 a request is received to retrieve an attribute associated with a customization object using an attribute ID. In 1402, it is determined if the attribute is designated as fetch optimized. If the attribute that is desired to be received is not designated as fetch optimized, then 1412 the appropriate database table(s) is/are accessed to retrieve the attribute starting with the table associated with the top of the class-based object hierarchy and proceeding down to the appropriate associated customization object database table. If the attribute is designated as fetch optimized, then in 1404 a set of attributes is accessed using the appropriate type and type version. The set of attributes is stored in the table associated with the top of the class-based object hierarchy. In 1406, an attribute is identified using the attribute ID to be retrieved from the set of attributes and provided to the requestor. In 1408, deleted attributes are identified in set and remove from set. In 1410, the set of attributes is stored using the appropriate type and type version.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for storing data, comprising:
receiving an attribute for storage;
determining whether the attribute is searchable or non-searchable in storage using a processor;
storing the attribute as a searchable attribute in the event that the attribute is determined as searchable in storage, comprising storing the attribute in a database table corresponding to a hierarchical class-based object; and
storing the attribute as a non-searchable attribute in the event that the attribute is determined as non-searchable in storage, comprising:
storing the attribute together with one or more other non-searchable attributes as a set of attributes, wherein the set of attributes is stored in a database location outside the database table corresponding to the hierarchical class-based object, and wherein the database location is accessed before the database table; and
associating with the attribute a unique attribute identifier usable to distinguish between a name of the attribute and a name of one of the one or more other non-searchable attributes in the event that the name of the attribute and the name of the one of the one or more other non-searchable attributes are assigned the same name.

2. The method as in claim 1, further comprising associating an attribute type with the set of attributes.

3. The method as in claim 2, further comprising associating an attribute type version with the attribute type.

4. The method as in claim 3, wherein the attribute type version is incremented in the event that an attribute is added to or deleted from the attribute type.

5. The method as in claim 3, wherein the attribute type version is incremented in the event that an attribute format of an attribute in the set of attributes is modified.

6. The method as in claim 1, further comprising storing the attribute and the unique attribute identifier as part of the set of attributes.

7. The method as in claim 1, wherein the unique attribute identifier comprises a unique number for the set of attributes.

8. A system for storing data, comprising:
an interface for receiving an attribute for storage;
a processor for:
determining whether the attribute is searchable or non-searchable in storage using a processor;
storing the attribute as a searchable attribute in the event that the attribute is determined as searchable in storage, comprising storing the attribute in a database table corresponding to a hierarchical class-based object; and
storing the attribute as a non-searchable attribute in the event that the attribute is determined as non-searchable in storage, comprising:
storing the attribute together with one or more other non-searchable attributes as a set of attributes, wherein the set of attributes is stored in a database location outside the database table corresponding to the hierarchical class-based object, and wherein the database location is accessed before the database table; and
associating with the attribute a unique attribute identifier usable to distinguish between a name of the attribute and a name of one of the one or more other non-searchable attributes in the event that the name of the attribute and the name of the one of the one or more other non-searchable attributes are assigned the same name.

9. The system as in claim 8, wherein the processor is further for associating an attribute type with the set of attributes.

10. The system as in claim 9, wherein the processor is further for associating an attribute type version with the attribute type.

11. The system as in claim 10, wherein the attribute type version is incremented in the event that an attribute is added to or deleted from the attribute type.

12. The system as in claim 10, wherein the attribute type version is incremented in the event that an attribute format of an attribute in the set of attributes is modified.

13. The system as in claim 8, wherein storing a set of attributes further comprises storing the attribute and the unique attribute identifier as part of the set of attributes.

14. The system as in claim 8, wherein the unique attribute identifier comprises a unique number for the set of attributes.

15. A computer program product for storing data, the computer program product being embodied in a non-transitory computer readable medium and comprising computer instructions for:
receiving an attribute for storage;
determining whether the attribute is searchable or non-searchable in storage using a processor;
storing the attribute as a searchable attribute in the event that the attribute is determined as searchable in storage, comprising storing the attribute in a database table corresponding to a hierarchical class-based object; and
storing the attribute as a non-searchable attribute in the event that the attribute is determined as non-searchable in storage, comprising:
storing the attribute together with one or more other non-searchable attributes as a set of attributes, wherein the set of attributes is stored in a database location outside the database table corresponding to the hierarchical class-based object, and wherein the database location is accessed before the database table; and associating with the attribute a unique attribute identifier usable to distinguish between a name of the attribute and a name of one of the one or more other non-searchable attributes in the event that the name of the attribute and the name of the one of the one or more other non-searchable attributes are assigned the same name.

16. The computer program product recited in claim 15, further comprising associating an attribute type with the set of attributes.

17. The computer program product recited in claim 16, further comprising associating an attribute type version with the attribute type.

18. The computer program product recited in claim 17, wherein the attribute type version is incremented in the event that an attribute is added to or deleted from the attribute type.

19. The computer program product recited in claim 17, wherein the attribute type version is incremented in the event that an attribute format of an attribute in the set of attributes is modified.

20. The computer program product recited in claim 15, further comprising storing the attribute and the unique attribute identifier as part of the set of attributes.

* * * * *